(12) United States Patent
Truelsen

(10) Patent No.: US 7,743,530 B2
(45) Date of Patent: Jun. 29, 2010

(54) SHOE AND A METHOD OF MAKING SHOES

(75) Inventor: Ejner Truelsen, Tønder (DK)

(73) Assignee: ECCO SKO A/S, Tonder (DK)

( * ) Notice: Subject to any disclaimer, the term of this patent is extended or adjusted under 35 U.S.C. 154(b) by 657 days.

(21) Appl. No.: 11/667,160

(22) PCT Filed: Nov. 8, 2005

(86) PCT No.: PCT/DK2005/000712

§ 371 (c)(1),
(2), (4) Date: May 4, 2007

(87) PCT Pub. No.: WO2006/048024

PCT Pub. Date: May 11, 2006

(65) Prior Publication Data

US 2007/0296115 A1 Dec. 27, 2007

(30) Foreign Application Priority Data

Nov. 8, 2004 (DK) ................................ 2004 01711

(51) Int. Cl.
A43B 13/12 (2006.01)
A43B 13/14 (2006.01)
A43B 13/04 (2006.01)

(52) U.S. Cl. .................... 36/30 R; 36/25 R; 36/27; 12/145; 12/142 T

(58) Field of Classification Search .......... 36/30 R, 36/30 A, 31, 28, 25 R, 37, 17 PW; 264/244; 12/145, 146 BC, 142 R, 142 T
See application file for complete search history.

(56) References Cited

U.S. PATENT DOCUMENTS

| 3,151,405 | A | * | 10/1964 | Ludwig | 36/17 R |
| 4,597,196 | A | * | 7/1986 | Brown | 36/44 |
| 4,651,444 | A | * | 3/1987 | Ours | 36/93 |
| 4,730,402 | A | * | 3/1988 | Norton et al. | 36/30 R |
| 4,759,136 | A | * | 7/1988 | Stewart et al. | 36/114 |

(Continued)

FOREIGN PATENT DOCUMENTS

FR 2105302 4/1972

(Continued)

Primary Examiner—Ted Kavanaugh
(74) Attorney, Agent, or Firm—Cooer & Dunham LLP

(57) ABSTRACT

A method of making a shoe, said shoe having an interior sole (10) and an outsole (8) being integrally moulded onto an upper (1) with an insole (4), comprising the following steps: providing of a last (30) having a wedge-shaped recess (32) is its heel area, said recess being defined by a projecting rib (33), providing an upper (1) with an insole (4) on the last (30), said insole (4) being provided with a hole (7) in the heel area, arranging the lower part of the last provided with the upper (1) and the insole (4) in a mould (34), injecting a plastic material into a closed mould cavity formed by the last and the mould, allowing the injected material to harden, whereby the rib (32) of the last (30) forms a corresponding groove (12) between the interior sole (10) and the inner face of the upper (1), removing the upper (1) with the moulded-on soles (8, 10) from the last (30), providing a separately formed insert (13) of a shape substantially corresponding to the shape of the groove (12) and placing the insert in the groove (12).

11 Claims, 4 Drawing Sheets

U.S. PATENT DOCUMENTS

| | | | | |
|---|---|---|---|---|
| 4,823,420 | A * | 4/1989 | Bartneck | 12/142 N |
| 5,572,805 | A * | 11/1996 | Giese et al. | 36/30 R |
| 6,618,960 | B2 * | 9/2003 | Brown | 36/44 |
| 6,713,006 | B1 * | 3/2004 | Redin Gorraiz | 264/154 |
| 6,880,266 | B2 * | 4/2005 | Schoenborn et al. | 36/28 |
| 2007/0175068 | A1 * | 8/2007 | Lin | 36/103 |
| 2007/0296115 | A1 * | 12/2007 | Truelsen | 264/244 |

FOREIGN PATENT DOCUMENTS

| | | |
|---|---|---|
| FR | 2676893 | 12/1992 |
| GB | 2027581 | 2/1980 |

* cited by examiner

SHOE AND A METHOD OF MAKING SHOES

TECHNICAL FIELD

The invention relates to a method of making shoes, said shoes comprising:
an upper with an insole,
an interior sole provided at least in the heel area of the shoe and forming a so-called heel wedge, and an outsole moulded onto the insole and onto a circumferential lower area of the upper adjacent the insole, and where the interior sole and the outsole are integrally moulded in a plastic material,
said method including the following steps of:
a. providing a last having a lower surface which at least in a heel area thereof is provided with a wedge-shaped recess being laterally and rearwards defined by a substantially U-shaped projecting rib,
b. providing an upper having an insole on the last, in a heel area said insole being provided with at least one through-going hole,
c. providing a sole mould comprising two mould halves being mutually laterally movable between an open position and a closed position,
d. arranging a lower portion of the last being provided with the upper and insole in the mould in the open position thereof,
e. closing the mould so as to form a closed cavity between the last provided with the upper and the insole and the mould halves,
f. injecting a plastic material into the closed mould cavity, whereby said cavity and the recess of the last being connected therewith via the hole of the insole are filled with the injected material,
g. allowing the injected material to harden, whereby the rib of the last forms a corresponding groove between the heel wedge of the interior sole and an inner face of the upper,
h. opening the mould and removing the upper with the moulded interior sole and outsole from the last.

For appearances sake it may be desirable to manufacture shoes with moulded-on soles having a low sole height in the heel area when seen from the outside. Low sole height implies that the sole is low especially in the heel area when seen from the outside. Customarily, this has been obtained by moulding the outsole onto the upper by means of a conventional last and subsequently placing a separately made interior sole or so-called heel wedge in the interior of the shoe. This interior sole provides the desired difference in height between the heel area of the foot and the forefoot area of the foot. At this method a conventional last made from hard plastics, which is optionally reinforced, can be used, but the making of a separate interior sole and the placing thereof in the shoe increases the manufacturing costs.

BACKGROUND ART

It is, however, known from GB 2027581 to mould the interior sole integrally with the outsole.

It is also known to use a method of the above type for moulding an outsole integrally with an interior sole on an upper to obtain a shoe with a low sole. At the known method a last is used having a very thin rib defining the wedge-shaped recess forming the interior sole so as to allow the interior sole to abut the inner face of the upper as closely as possible. However, the use of the very thin, projecting rib entails that the last has to be made of a hard metal, such as steel or hard aluminium, to prevent deformation of the rib when it is subjected to the closing pressure of the sole mould. The manufacture of shoe lasts in a hard metal is, however, considerably more expensive than the manufacture of shoe lasts in a plastic material, for which reason the use of metal lasts increases the shoe production costs significantly. Furthermore, in practice it has proved difficult to completely avoid deformation of the thin projecting rib on the last.

DESCRIPTION OF THE INVENTION

The object of the present invention is to provide a method of the above type which makes it possible to use a non-metallic last and thus to reduce the manufacturing costs of both the last and the shoes manufactured.

The method according to the invention is characterised in:
j. providing a separately formed insert having a supporting portion and a rib portion shaped substantially corresponding to the shape of the groove, and
k. placing the insert in the shoe with its rib portion being received in the groove.

Since an insert is to be placed in the groove formed by the rib of the last, said rib may in principle have any thickness including such a thickness that the shoe last may be made of a non-metallic material, eg. a plastic material, optionally a reinforced plastic material such as polyethylene with high density (HDPE). This significantly reduces the last manufacturing costs and despite the manufacture of a separate insert, it has been found that a reduction of the total shoe manufacturing costs is obtained at the method according to the invention. At the same time, the use of a separate insert offers various user advantages, as differently shaped lasts may be used according to the user's wish. Moreover, a material of a different hardness than the material used for the outsole and interior sole can be used for the insert. Finally, a visual effect may also be obtained by making the insert in a colour different to that of the interior sole and outsole.

The rib portion of the insert may be removably received in the groove to enable a replacement of the insert. The rib portion of the insert may, however, also be received non-removably in the groove, eg. by gluing.

Furthermore, co-acting engagement means may be provided in the lateral face of the insert's rib portion facing the lateral face of the interior sole and in the lateral face of the interior sole for removably retaining the insert in the groove. As a result the insert is kept in place and replacement thereof is possible.

Moreover, the supporting portion of the insert may have an upper face being substantially flush with the upper face of the interior sole so as to avoid uncomfortable transitions between the insert and the interior sole. It is, however, also possible to shape the insert to allow its supporting portion to be on a higher level than the upper face of the interior sole and subsequently balancing out the difference in height by means of a sock which is glued onto the interior sole.

Furthermore, the supporting portion of the insert facing away from the rib portion may have an upper face inclining upwards and outwards towards the inner face of the upper at least in the heel area so as to provide lateral support in the heel area.

Moreover, at least in the heel area the supporting portion of the insert facing away from the rib portion may include circumferential bead extending upwards along the inner face of the upper in abutment therewith. As a result, a strong sideways support of the foot is obtained.

Furthermore, in inward direction, the supporting portion of the insert may extend past the rib portion to form a plate-shaped area which overlaps and abuts the upper face of the interior sole.

Finally, a sock may be attached to the supporting portion of the insert, eg. by gluing or sewing.

The invention further relates to a shoe including:

an upper with an outer face and an inner face, an insole connected to the upper and having an outer face and an inner face and provided with at least one through-going hole in a heel area thereof, an outsole of a plastic material and moulded onto the outer face of the insole and onto a circumferential lower area of the outer face of the upper up to the insole, and an interior sole provided at least in a heel area of the shoe and forming a so-called heel wedge on the inner face of the insole, said outsole and interior sole being integrally moulded, whereby the plastic material extends through the at least one hole of the insole, and where a groove being substantially U-shaped in a top view is provided between the heel wedge and the inner face of the upper, said groove extending between a lateral face of the interior sole and the inner face of the upper.

A shoe of the above type is known, in which the groove between the lateral face of the interior sole and the inner face of the upper is very narrow. This has an adverse effect on the production costs and may render manufacture problems as mentioned above.

It is thus the object of the invention to remedy the drawbacks of the known shoe and to provide a shoe which further offers various advantages for the user in relation to known shoes.

According to the invention the shoe is characterised by a separately formed insert having a U-shaped rib portion of a shaped corresponding substantially to the shape of the groove and a supporting portion facing away from the rib portion, said rib portion being received tight-fittingly in the groove.

As a result, as mentioned above manufacturing and financial advantages along with various advantages in relation to the user are gained.

By having the rib portion of the insert being removably received in the groove, it is possible to arrange differently shaped inserts or inserts of varying hardness in the same shoe, eg. adapted according to the wish of the user.

Furthermore, co-acting engagement means may be provided in the lateral face of the insert's rib portion which faces the lateral face of the interior sole and in the lateral face of the interior sole for removably retaining the insert in the groove.

Moreover, the supporting portion of the insert may have an upper face being substantially flush with the upper face of the insert.

Furthermore, at least in the heel area the supporting portion of the insert facing away from the rib portion may have an upper face inclining upwards and outwards towards the inner face of the upper.

Moreover, at least in the heel area the supporting portion of the insert facing away from the rib portion may include a circumferential bead extending upwards along the inner face of the upper in abutment therewith.

Furthermore, in inward direction, the supporting portion of the insert may extend past the rib portion to form a plate-shaped area which overlaps and abuts the upper face of the interior sole.

Moreover, a sock may be attached to the supporting portion of the insert, eg. by gluing or sewing.

Finally, the insert may be made from a plastic material having a different hardness than the plastic material of the outsole and the interior sole.

It should also be noted that it will be obvious for a person skilled in the art to provide suitable materials for the integrally moulded outsole and interior sole. Examples of suitable plastic materials include thermoplastic or thermosetting polyurethane (PU) and PVC. A plurality of plastic materials which are obvious for a person skilled in the art may be used for the insert including the above materials and EVA.

BRIEF DESCRIPTION OF THE DRAWINGS

The invention is explained in detail below with reference to the drawings, in which.

BEST MODE(S) FOR CARRYING OUT THE INVENTION

Figure 1:
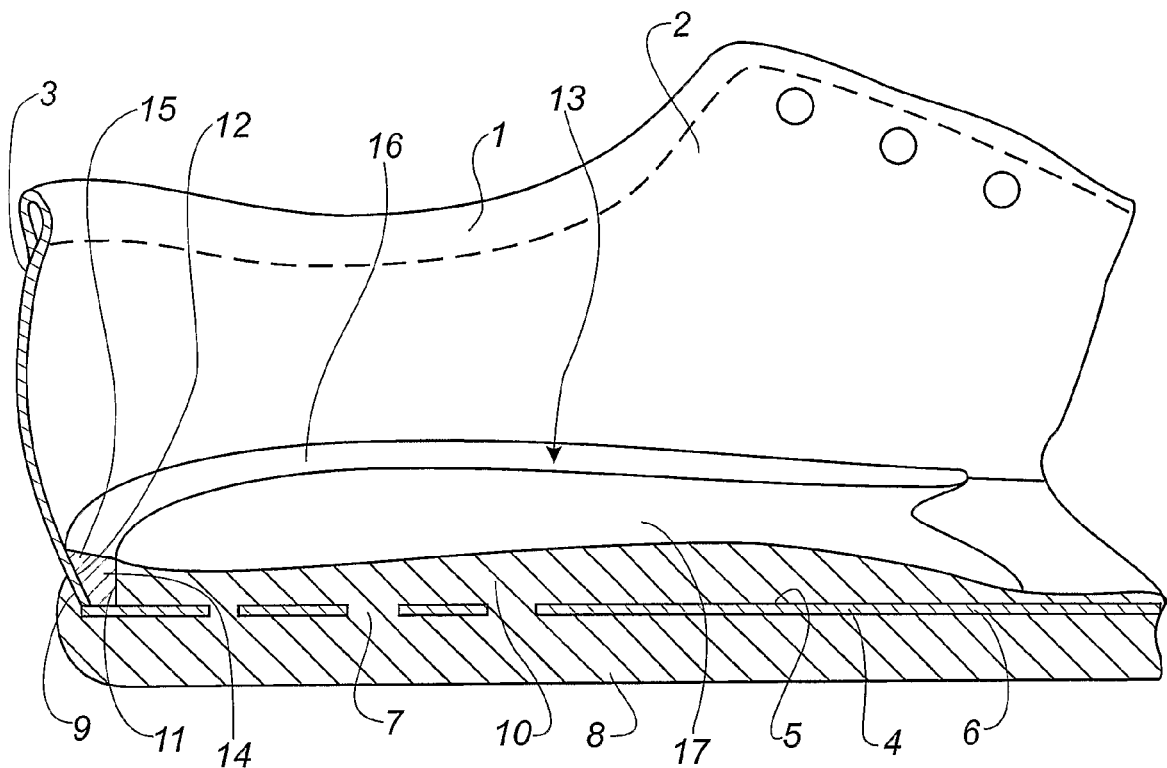
FIG. 1 is a central longitudinal sectional and perspective view of a portion of a shoe according to the invention.

The embodiment of a shoe according to the invention shown in FIG. 1 includes an upper 1 with an inner face 2 and an outer face 3. An insole 4 is connected to the upper for instance by sewing. The insole 4 has an inner face 5 and an outer face 6. A number of through-going holes are provided in the heel area of the insole 4.

The shoe further includes an outsole 8 of a resilient, preferably foamed, material, eg. PU, which is moulded onto the outer face 6 of the insole and onto a circumferential lower area 9 of the outer face 3 of the upper 1 adjacent the insole 4, and an interior sole 10 extending from the heel area of the shoe to the forefoot area. The said interior sole 10 is denoted as a heel wedge or merely a wedge serving to raise the heel area of the foot in relation to the forefoot and supporting the arch of the foot at the same time. The interior sole 10 is moulded onto the inner face 5 of the insole and additionally integrally moulded with the outsole 8, whereby the plastic material extends through the holes 7 of the insole 4.

In top view, a substantially U-shaped groove 12 is provided between the lateral face 11 of the interior sole 10 and the inner face 2 of the upper, said groove being downwardly defined by the inner face 5 of the insole. The depth of the groove 12 varies according to the outline of the interior sole 10 and thus has substantially no depth in the area in which the insole ends in the forefoot area, i.e. it passes smoothly thereinto.

A rib portion 14 of an insert 13 and made from a resilient plastic material, eg. a foamed plastic, is arranged in the groove 12. In a top view the rib portion 14 of the insert 13 is U-shaped and of substantially the same shape as the groove 12. The insert 13 is further provided with a supporting portion 15 facing away from the rib portion 14 and having an upper face 16 passing smoothly into the upper face 17 of the interior sole 10. In FIG. 1 the insert 13 is substantially wedge-shaped in a cross-sectional view, whereby a reliable retainment thereof in the groove is obtained.

Figure 2:
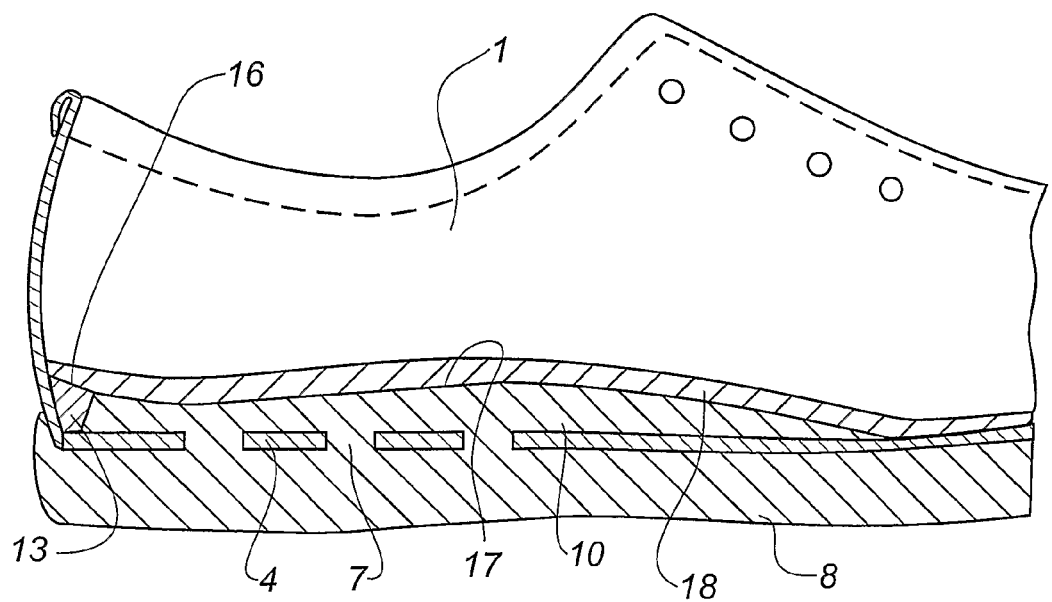
FIG. 2 is vertical sectional view through the shoe shown in FIG. 1 provided with a sock.

The shoe shown in FIG. 2 only differs from the shoe shown in FIG. 1 by being provided with a sock 18. The sock 18 extends in the entire inner sole area of the shoe, i.e. it covers the insert 13, the interior sole 10 and the insole 4 in the forefoot area. The sock 18 may be removably arranged, but may also be attached to the upper face 16 of the insert 13, eg. by gluing or sewing, such that the insert 13 is removed from the shoe with the sock 18.

Figure 3:
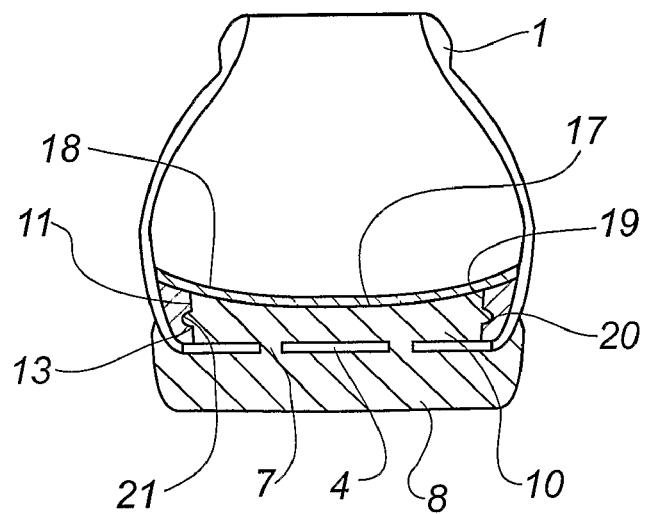
FIG. 3 is a cross-sectional view through the heel area of a modification of the shoe shown in FIG. 2.

FIG. 3 is a vertical cross-sectional view through the heel area of a modification of the shoe shown in FIG. 2. The modified shoe shown in FIG. 3 only differs from the shoe shown in FIG. 2 by the lateral face 11 of the interior sole 10 and the lateral face 19 of the insert 13 facing the lateral face 11 of the interior sole having co-acting engagement means which further ensure a reliable retainment of the insert 13 in its groove. In this case, the engagement means are shaped as projections 20 on the lateral face 11 of the interior sole 10 and engage a recess 21 in the lateral face 19 of the insert 13. The engagement means may of course also be placed conversely or be shaped as a plurality of separate projections and a corresponding number of separate recesses.

FIGS. 1-3 further illustrate that the previously mentioned low sole appearance in the heel area in an outside view is obtained by the outsole 8 extending less upwards onto the outer face 3 of the upper than to the level of the upper face 17 of the interior sole 10.

Figure 4:
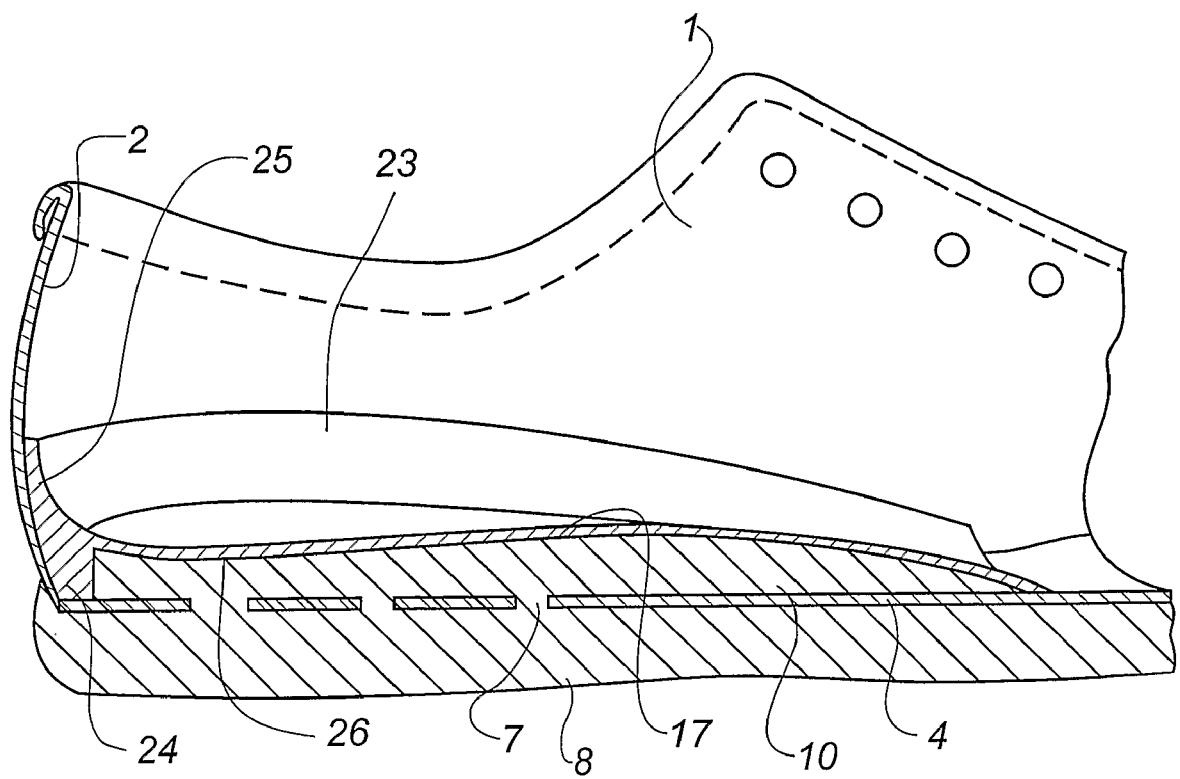
FIG. 4 is a central longitudinal sectional and perspective view of an embodiment of a shoe according to the invention.
Figure 5:
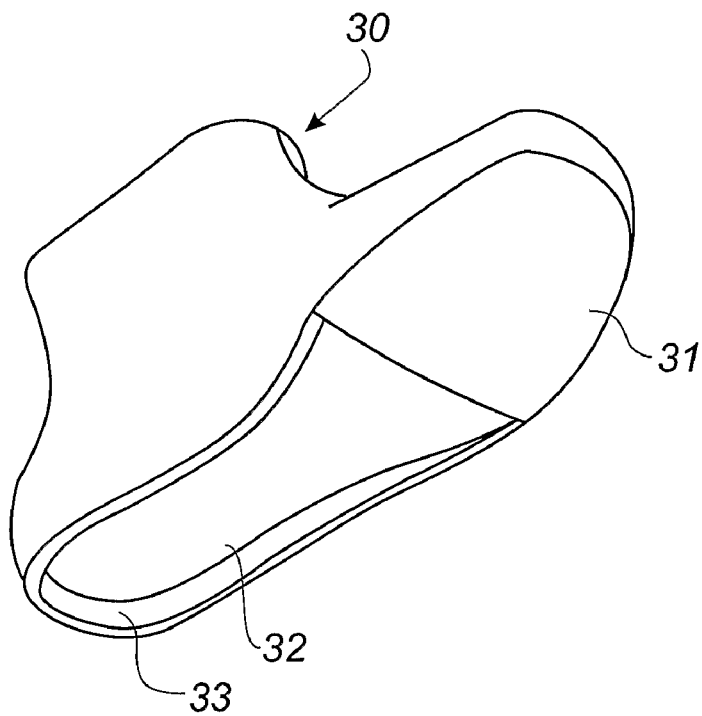
FIG. 5 is an downwardly inclined perspective view of a last for use in the manufacture of the shoe shown in FIGS. 1, 2 and 4 at a method according to the invention.
Figure 6:
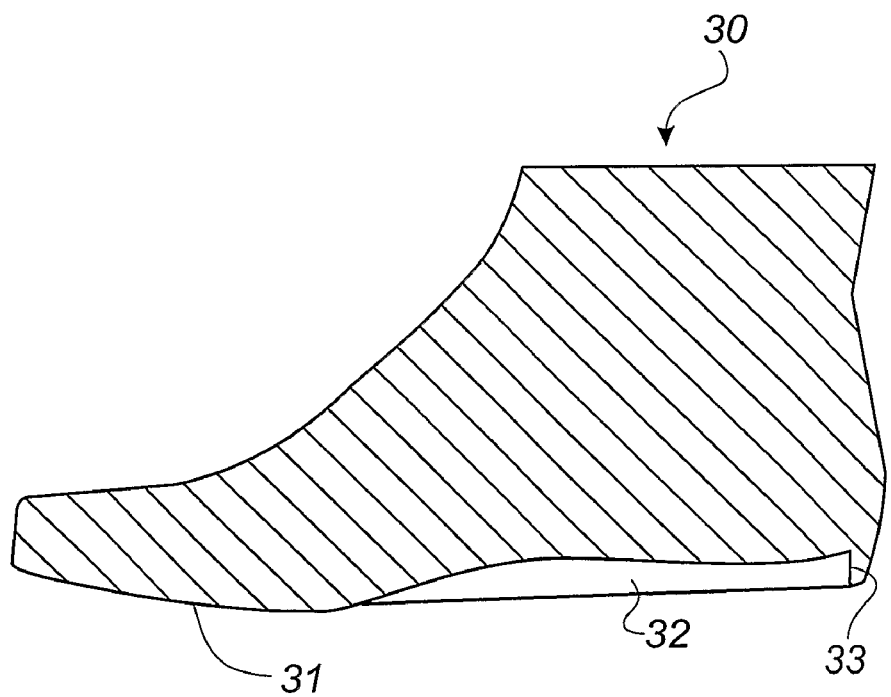
FIG. 6 is vertical sectional view through the last shown in FIG. 5.

The embodiment of a shoe according to the invention shown in FIG. 4 only differs from those shown in FIGS. 1 and 2 by the design of the insert 23. The rib portion 24 of the insert 23 corresponds to the rib portion 14 of the insert 13 shown in FIGS. 1 and 2. The supporting portion of the insert 23 is, however, formed as a circumferential bead extending upwards along the inner face of the upper so as to provide lateral support of the foot. Furthermore, in inward direction, the supporting portion 25 of the insert extends past the rib portion 24 to form a plate-shaped area which overlaps and abuts the upper face 17 of the interior sole 10.

The method according to the invention for making shoes will now described with reference to FIGS. 5-8. For carrying out the method according to the invention a last 30 with a lower face 31 is used (see FIGS. 5 and 6). A wedge-shaped recess 32 is provided in the lower face 31, said recess being laterally and rearwards defined by a projecting rib 33 being substantially U-shaped when seen in direction towards the lower face 31 of the last 30. The shape of the wedge-shaped recess 32, which is defined by the projecting rib 33, corresponds substantially to the shape of the interior sole 10, the recess forming the interior sole in a subsequent moulding process. Similarly, the shape of the projecting rib 33 of the last 30 corresponds substantially to that of the groove 12 of the shoe.

An upper 1 with an insole 4, which is provided with one or more through-going holes 7 in the heel area, is arranged on the last 30. The holes 7 are provided in the area of the last 30 with the wedge-shaped recess 32.

Figure 7:
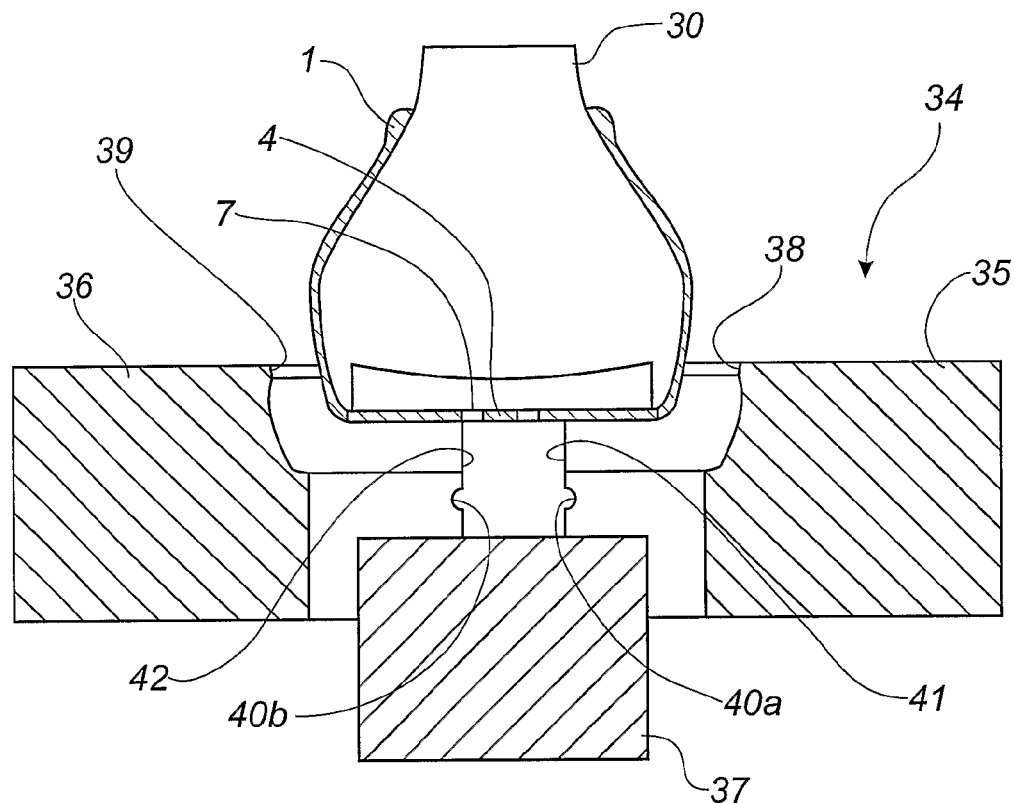
FIG. 7 is a vertical cross-sectional through the heel area of a mould for carrying out the method according to the invention, the mould being shown in its open position.
Figure 8:
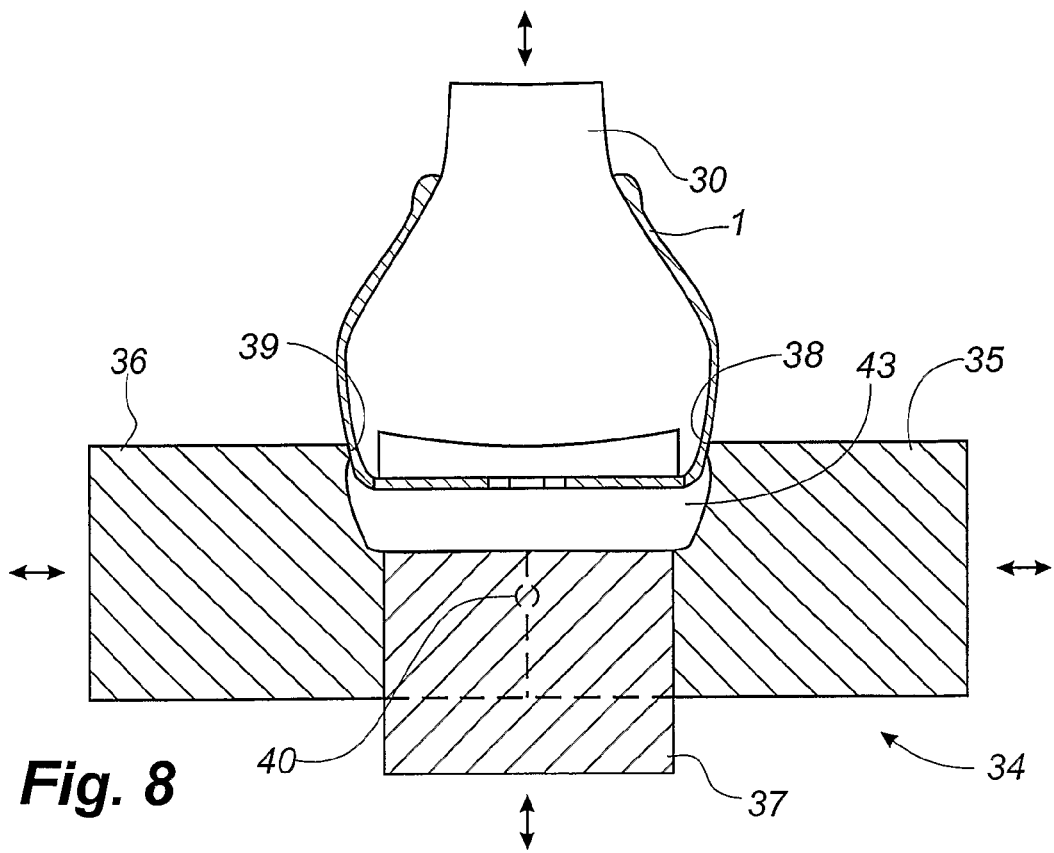
FIG. 8 is an illustration corresponding to that in FIG. 7 with the mould in its closed position.

For carrying out the method a mould 34 as shown in FIGS. 7 and 8 may be used. This mould 34 comprises two mould halves 35, 36 being laterally movable between an open position (shown in FIG. 7) and a closed position (shown in FIG. 8). The mould 34 further comprises a bottom part or bottom piston 37 being vertically movable between an open position of the mould shown in FIG. 7 and a closed position of the mould shown in FIG. 8. In the closed position of the mould 34 shown in FIG. 8 the mould parts 35, 36, 37 define a cavity corresponding to the outer shape of the outsole 8 which is to be moulded on the upper 1 with the insole 4 being arranged on the last 30.

For moulding of the outsole 8 and the interior sole 10 a lower part of the last 30 provided with the upper 1 and the insole 4 is placed in the mould in the open position thereof as shown in FIG. 7. The mould halves 35 and 36 are then moved to their closed position shown in FIG. 8, whereby the edge portions 38, 39 sealingly abut the upper 1 along a circumferential area thereof. As a result a closed cavity is formed between the mould parts 35, 36 and 37.

A liquid sole moulding material is then injected into the cavity via an inlet 40 formed of inlet grooves 40a, 40b provided in the closing faces 41, 42 of the mould halves 35, 36, said faces forming the longitudinal closing plane of the mould in its closing position.

After injection of the moulding material the bottom part 37 is moved upwards to the position shown in FIG. 8 which is the closed position of the mould. In this closed position the mould parts 35, 36 and 37 jointly with the last 30 define a closed cavity 43 of a shape corresponding to the shape of the outsole 8 and the interior sole 10.

In the present example, in which a foamed plastic, eg. polyurethane, is used as moulding material, said material expands and fills the cavity 43 and via the through-going holes 7 of the insole 4 also flows into the recess 32 of the last 30. As a result, the moulding material is firmly moulded onto the outer face and inner face of the insole and to the lower portion of the upper 1 after hardening.

When the injected moulding material is hardened, the mould is opened and the last 30 with the outsole 8 and interior sole 10 moulded thereon is removed from the mould. Then the upper 1 with interior sole and the outsole is removed from the last 30.

A separately made insert is then provided, eg. the insert 13 shown in FIG. 1, which has a supporting portion 15 and a rib portion 14 of a shape substantially corresponding to the shape of the groove 12 which is formed of the projecting rib 33 of the last 30 at the moulding process described above.

The insert is then placed in the shoe with its rib portion being received in the groove. Subsequently thereto for instance the sock 18 shown in FIG. 2 may be arranged in the shoe.

As regards the design of the mould 34, it should be noted that depending on the moulding material used, it is not necessary to use a vertically movable bottom part 37. It is thus also possible to mould the soles by means of a mould which only consists of two mutually laterally movable mould halves, whereby the embodiment of the mould halves shown by means of dotted lines in FIG. 8 is obtained, the movable mould halves having bottom parts which in the closed position of the mould halves downwardly define the cavity 43. Naturally, in this embodiment of the mould the inlet is arranged such that it opens into the cavity 43.

The invention claimed is:

1. Shoe including:
    an upper (1) with an outer face (3) and an inner face (2)
    an insole (4) connected to the upper and having an outer face (6) and an inner face (5) and provided with at least one through-going hole (7) in a heel area thereof,
    an outsole (8) of a plastic material and moulded onto the outer face (6) of the insole (4) and onto a circumferential lower area (9) of the outer face (3) of the upper (1) adjacent the insole (4),
    an interior sole (10) provided at least in a heel area of the shoe and forming a so-called heel wedge on the inner face (5) of the insole (4),
    said outsole and interior sole being integrally moulded, whereby the plastic material extends through the at least one hole of the insole (4), and where a groove being substantially U-shaped in a top view is provided between the heel wedge (10) and the inner face of the upper (1), said groove extending between a lateral face of the interior sole (10) and the inner face (2) of the upper characterised by a separately formed insert (13;23) having a U-shaped rib portion (14;24) of a shape substantially corresponding to the shape of the groove and a supporting portion (15; 25) facing away from the rib portion, said rib portion (14; 24) being received in the groove (12).

2. Method of making shoes, said shoe comprising:

an upper (1) with an insole (4), an interior sole (10) provided at least in a heel area of the shoe and forming a so-called heel wedge, and an outsole (8) moulded onto the insole (4) and onto a circumferential lower area (9) of the upper (1) adjacent the insole (4), and where the interior sole (10) and the outsole (8) are integrally moulded in a plastic material, said method including the following steps of:

a. providing a last having a lower surface (31) which at least in a heel area thereof is provided with a wedge-shaped recess (32) being laterally and rearwards defined by a substantially U-shaped projecting rib, b. providing an upper (1) having an insole (4) on the last (30), said insole (4) being provided with at least one through-going hole (7), c. providing a sole mould (34) comprising two mould halves (35,36) being mutually laterally movable between an open position and a closed moulding position, d. arranging a lower portion of the last (30) being provided with the upper (1) and the insole (4) in the mould in the open position thereof, e. closing the mould so as to form a closed cavity between the last (30) provided with the upper (1) and the insole (4) and the mould halves, f. injecting a plastic material into the closed mould cavity, whereby said cavity and the recess (32) of the last being connected therewith via the hole (7) of the insole (4) are filled with the injected material, g. allowing the injected material to harden, whereby the rib (33) of the last (30) forms a corresponding groove (12) between the interior sole and an inner face of the upper (1), h. opening the mould and removing the upper (1) with the moulded soles (8, 10) from the last (30), characterised by, j. providing a separately formed insert (13; 23) having a supporting portion (15; 25) and a rib portion (14; 24) having a shape substantially corresponding to the shape of the groove (12), k. placing the insert (13; 23) in the shoe with its rib portion being received in the groove (12).

3. Method according to claim 2, characterised in that the rib portion (14; 24) of the insert (13; 23) is removably received in the groove (12).

4. Method according to claim 3, characterised in that co-acting engagement means (20, 21) are provided in the lateral face (19) of the insert's (13) rib portion (14) facing the lateral face of the interior sole (10) and in the lateral face of the interior sole.

5. Method according to claim 2, characterised in that co-acting engagement means (20, 21) are provided in the lateral face (19) of the insert's (13) rib portion (14) facing the lateral face of the interior sole (10) and in the lateral face of the interior sole.

6. Method according to claim 2, characterised in that the supporting portion (15) of the insert (13) has an upper face (16) being substantially flush with the upper face (17) of the interior sole (10).

7. Method according to claim 2, characterised in that the supporting portion (15; 25) of the insert (13; 23) facing the away from the rib portion (14; 24) has an upper face inclining upwards and outwards towards the inner face of the upper (1), at least in the heel area.

8. Method according to claim 2, characterised in that at least in the heel area the supporting portion of the insert (23) facing away from the rib portion includes a circumferential bead extending upwards along the inner face of the upper (1) in abutment therewith.

9. Method according to claim 2, characterised in that in inward direction the supporting portion (25) of the insert (23) extends past the rib portion (24) to form a plate-shaped area (26) which overlaps and abuts the upper face (17) of the interior sole (10).

10. Method according to claims 2, characterised in that a sock (18) is attached to the supporting portion (15) of the insert (13), eg. by gluing or sewing.

11. Method according to claim 2, characterised iii that the insert (13; 23) is made from a plastic material having a different hardness than the plastic material of the outsole (8) and the interior sole (10).

* * * * *